Figure 1:
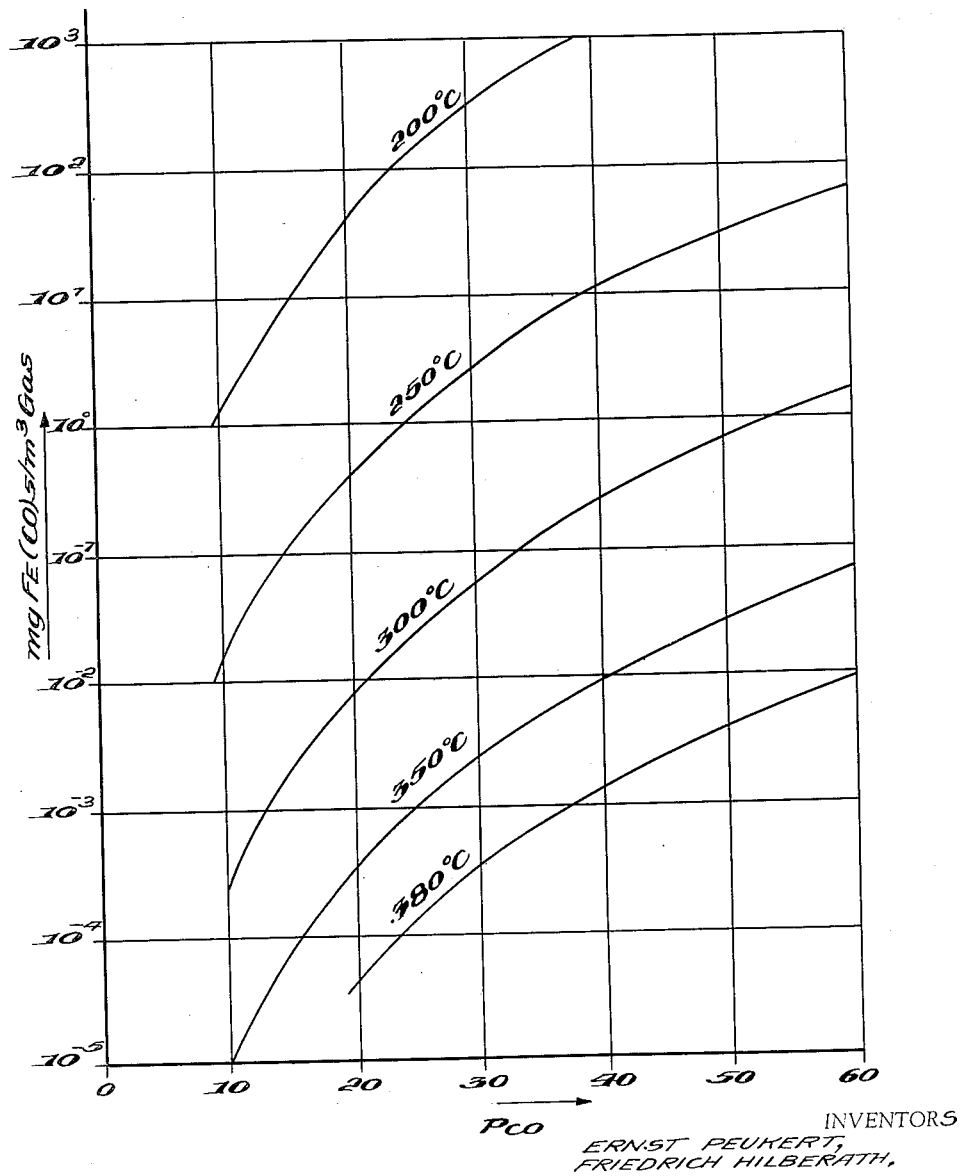

Dec. 9, 1952   E. PEUKERT ET AL   2,621,202
PRODUCTION OF ALCOHOLS
Filed Aug. 1, 1949   3 Sheets-Sheet 3

Fig. 3.

INVENTORS
ERNST PEUKERT,
FRIEDRICH HILBERATH,
BY Bailey, Stephens & Huettig
ATTORNEYS Patented Dec. 9, 1952

2,621,202

UNITED STATES PATENT OFFICE 2,621,202

PRODUCTION OF ALCOHOLS

Ernst Peukert and Friedrich Hilberath,
Wesseling, Bez, Cologne, Germany

Application August 1, 1949, Serial No. 107,888
In France September 19, 1947

6 Claims. (Cl. 260—449.5)

1

The invention relates to the production of alcohols, especially methanol, from gases containing carbon monoxide and hydrogen in iron apparatus.

The known synthesis requires two mols of hydrogen per mol of carbon monoxide. Accordingly, the gases employed for the synthesis contain carbon monoxide and hydrogen in about the stoichiometric proportion of 1:2. In addition, the gases mostly contain small fractions of inert constituents such as nitrogen and methane, the concentration of which to above a certain degree, mostly 20%, is avoided by withdrawing a corresponding quantity of gas from the gas circuit.

The addition of the fresh synthesis gas into the circuit of the synthesising apparatus is usually effected before the entry of the circuit gas into the heat exchanger in order to allow it to take part in the exchange of heat and to obtain, in the long path, a thorough mixing with the circuit gas before the entry into the catalyst chamber. The gas travelling through the circuit has the maximum content of carbon monoxide after the addition of the fresh gas, that is to say on its journey towards the catalyst, and has its lowest content of carbon monoxide after it issues from the catalyst chamber. The content of carbon monoxide at the point of entry into the catalyst is normally between 15 and 25%, preferably about 20%. A content of 20% of carbon monoxide in the gas corresponds to a partial pressure of 60 atmospheres at a working pressure of 300 atmospheres.

The customary pressures for the high-pressure synthesis of alcohols are above 100 atmospheres, preferably about 300 atmospheres. The gases to be reacted are, on passing through the apparatus, heated from the ordinary temperature to the reaction temperature which, as a rule, is above 250° C. After the reaction, the gases are again cooled to ordinary temperature in order to separate the product of the reaction in the form of liquid. The gas, which, on account of the condition of equilibrium, has only partly reacted on a single passage through the catalyst, is passed through the apparatus after replacing the consumed fractions by fresh gas in the circuit. A heat exchange takes place between the inflowing cold gas and the outflowing hot gas. Since the formation of alcohol is an exothermic process, heat must be conducted away from the contact chamber; this is effected, for example, by arranging for a part of the heat exchange to take place in the catalyst chamber or by adding cold circuit gas into the catalyst chamber. In the latter case, the catalyst is, as a rule, divided into a plurality of layers.

The high-pressure synthesis of alcohols is carried out under temperature and pressure conditions in which carbon monoxide and iron react with each other with the formation of iron pentacarbonyl, in accordance with the following equation:

$$Fe + 5CO \rightleftharpoons Fe(CO)_5$$

The equilibrium conditions, in the case of the iron-carbonyl reaction, are such that the quantity of carbonyl corresponding to the equilibrium increases greatly with increasing partial pressure of the carbon monoxide and diminishes greatly with increasing temperature. Figure 1 illustrates the equilibrium concentration of iron carbonyl in mixtures of carbon monoxide and hydrogen for the total pressure of 300 atmospheres mostly employed. The partial pressure of the carbon monoxide in atmospheres is represented on the abscissa and the concentration of iron carbonyl in milligrams of Fe(CO)$_5$ per cubic metre of gas (N. T. P.) is represented on the ordinate. The curves apply to temperatures of 200, 250, 300, 350 and 380° C.

In the case of the pressures and velocities of gas usual for the high-pressure synthesis of alcohols, the action of carbon monoxide on iron becomes perceptible above 100° C. and is at a maximum between 200 and 250° C. Above 250° C., the theoretical equilibria set in.

These conditions show that iron apparatus have not been employed economically in continuous operation for carrying out the synthesis commerically. If the production of alcohol is carried out under normal conditions of working in an iron apparatus, the following conditions arise: The synthesis gas, which is rich in carbon monoxide, passes through the temperature range of 100 to 250° C. both on its journey towards the catalyst vessel and on its return journey. There is thus produced, twice, an intense formation of iron carbonyl which expresses itself in a high degree of wearing away of material, especially in the heat exchanger which consists substantially of thin-walled tubes. Furthermore, the pressure-bearing walls of the catalyst vessel are endangered, since temperatures of above 100° C. are practically unavoidable on these even with good insulation. The iron carbonyl, which is formed on the passage of the gas towards the catalyst vessel, again decomposes into iron and carbon monoxide as soon as, with continued heating, the equilibrium concentration is exceeded. The decomposition principally takes place in the hot catalyst chamber and leads to a soiling of the catalyst which is detrimental to its catalytic action. In addition, the finely divided iron, which separates on the catalyst, promotes undesirable secondary reactions, especially the formation of methane. Finally, the iron carbonyl formed on the return journey of the gases from the catalyst to the condenser is dissolved in the condenser by the products of the synthesis which have separated in the form of liquid and renders their working up into pure products difficult.

The extent of the iron-damaging action of the carbon monoxide can be seen from the following works experiment which was carried out in an apparatus made of steel containing 3% of chromium at a working pressure of 200 atmospheres and with the employment of a reaction gas containing 15% of carbon monoxide. 2000 litres of methanol were produced per hour. This methanol contained up to 60 mgs. of iron per litre. The quantity of iron carried off as carbonyl from the apparatus with the methanol consequently amounted to about 120 gms. per hour or 2.9 kgs. per day. Since about the same quantity of iron was carried away as carbonyl on the journey of the reaction gases to the catalyst vessel and the carbonyl was decomposed on the catalyst, the daily loss of iron of the apparatus amounted to about 5 kgs. On the system of tubes of the heat exchanger, there was found to be, after a working period of one month, an appreciable wearing away of the walls of the tubes which could not be put up with in continuous working.

It is therefore understandable why there have hitherto been employed, for the high-pressure reactions of gases rich in carbon monoxide, apparatus in which the parts that might be endangered by attack by carbon monoxide are made of or coated with metals, such as copper or highly alloyed steels, which are resistant to carbon monoxide. This necessity renders the carrying out of the synthesis in practice expensive and difficult, especially for countries which have not at their disposal copper and the various metals employed as alloy constituents for high-quality alloy steels. Although there has been no lack of attempts to replace constructional materials which are resistant to carbon monoxide by ordinary materials, no satisfactory results have hitherto been obtained.

It has now been found that alcohols, especially methanol, can be produced from gases containing carbon monoxide and hydrogen even in iron apparatus if, having regard to the other working conditions, one works with partial pressures of carbon monoxide that are so low that practically no iron carbonyl is formed.

In carrying out the invention, it was ascertained that, for example, at the temperature of 250° C. and pressures of 300 to 600 atmospheres, the damaging of an apparatus made of iron or of lowly alloyed steels by carbon monoxide was prevented with certainty if partial pressures of carbon monoxide of 15 to 20 atmospheres are employed. A content of about 4 mgs. of iron carbonyl per cubic metre was ascertained. The equilibrium concentration of methanol corresponding to these partial pressures of carbon monoxide at the usual working temperature at the catalyst of 350° C. is about 5% and so less than half the value usual in the commercial manufacture of methanol. However, it is sufficient to render possible the production of alcohols with economically tolerable results. The results obtained by this embodiment of the invention are, however, not entirely satisfactory. Although the partial pressures of carbon monoxide stated cause no damage to iron apparatus, they easily lead to products the iron contents of which are above the values obtained in the usual apparatus equipped with materials which are resistant to carbon monoxide. Thus, the employment of still lower partial pressures of carbon monoxide is desirable if importance is attached to obtaining an extremely low iron content in the product but it is undesirable from the point of view that the methanol reactions are insufficient.

Starting from the consideration that low partial pressures of carbon monoxide are required only in the cold parts of the apparatus which are heated to about 250° C. whereas, in the hot parts of the apparatus, especially in the catalyst chamber, much higher partial pressures of carbon monoxide can be employed (for example, at a partial pressure of carbon monoxide of 30 atmospheres and a total pressure of 300 atmospheres and 350° C. only about 0.003 mg. of Fe(CO)$_5$ is contained per cubic metre of gas), it has further been found that the synthesis of alcohols can also be carried out in iron apparatus with normal yields and high conversions if low partial pressures of carbon monoxide are employed only at the parts of the apparatus which have temperatures that are favourable to the formation of carbonyl and higher partial pressures of carbon monoxide up to the order of magnitude of those ordinarily employed are maintained only at the parts at which the temperature rises above the temperature range which is favourable to the formation of iron carbonyl. Thus, in the colder parts of the apparatus, especially in the paths of the gas and in the heat exchanger, low partial pressures of carbon monoxide will be employed and higher partial pressures will be employed in the hot parts of the apparatus which are heated to at least above 250° C., preferably at the catalyst.

In order to fulfill these conditions, the fresh synthesis gas which is relatively rich in carbon monoxide, or a preponderant fraction thereof, is added, not, as has hitherto been usual, into the circuit gas before its entry into the heat exchanger, but is first added at a part of the apparatus which is so hot that, in accordance with the position of the iron-carbonyl equilibrium, it can bring about the formation of only a small, practically negligible quantity of iron carbonyl. The synthesis gas may be added immediately before the entry of the circuit gas into the catalyst chamber or may be added in the catalyst chamber itself or at both these positions. In contradistinction to the processes hitherto usual, the partial pressure of carbon monoxide in the circuit gas is adjusted to be so low, for example to 20 atmospheres, that damage by the action of carbon monoxide is avoided in the whole of the colder part of the apparatus.

An especially favorable embodiment of the process according to the invention is the following:

The synthesis gas, which is rich in carbon monoxide, is introduced into the catalyst itself. In this case, the catalyst should be divided into a plurality of layers and the synthesis gas should be delivered to the second and further layers of catalyst. When the heat of reaction is greater than the quantity of heat that can be absorbed from the supplied synthesis gas between its temperature of entry and the temperature at the catalyst, the excess of heat must be carried away by additional cooling which is advantageously effected by introducing cold circuit gas into the catalyst chamber.

For example, it is arranged that the first contact layers receive fresh synthesis gas, which, advantageously, is not preheated or is preheated only slightly, and the succeeding layers receive cold circuit gas or cold mixtures of the two gases. It is advisable to ensure good mixing of the directly supplied cold gases with the main stream of hot circuit gas in front of each contact layer in order thoroughly to equalize the temperatures and carbon-monoxide content of the gases. The mixing may be carried out with the aid of known devices.

By means of the invention it is possible to obtain a multiplication of the conversions which correspond to the partial pressures of carbon monoxide which must be maintained in the colder parts of the apparatus which are endangered by attack by carbon monoxide according to the position of the iron-carbonyl equilibrium.

Figure 2:
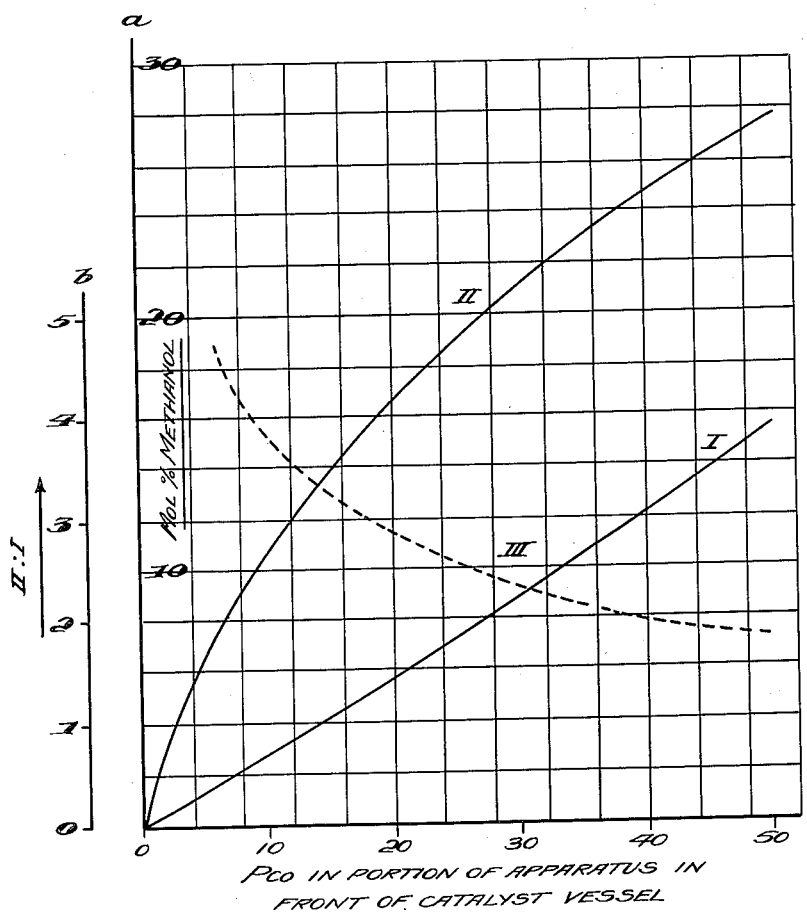

The advantages of the principal embodiment of the invention, in which different partial pressures of carbon monoxide are worked with in the colder parts of the apparatus from those worked with in the hotter parts, can be seen from Figure 2. In this, for pure mixtures of carbon monoxide and hydrogen at a pressure of 300 atmospheres and at a catalyst temperature of 380° C. and with the assumption of equal partial pressures of carbon monoxide before the entry of the gases into the catalyst vessel, there are compared the equilibrium concentrations of methanol which result in the case of the hitherto usual process and the process according to the invention.

On the abscissa are plotted the partial pressures of carbon monoxide in atmospheres in the part of the apparatus in front of the catalyst vessel and, on the ordinate, is plotted the equilibrium concentration of methanol in mols per cent and, on a second ordinate, is plotted the ratio of the equilibrium concentrations, produced by the process according to the invention, to the usual equilibrium concentrations. Curve I represents the equilibrium concentrations which are produced in the case of the usual method of working. In that case, the partial pressures of carbon monoxide plotted on the abscissa denote those employed at the catalyst, since the addition of freshly supplied synthesis gas, which is rich in carbon monoxide, on the path of the circuit gas towards the catalyst vessel is effected before the entry into the heat exchanger.

Curve II shows the greatly increased equilibrium values as compared with the values shown in curve I, these increased values being produced in the case of the process according to the invention. They are so great because, in this case, the partial pressures of carbon monoxide plotted on the abscissa represent the values behind the catalyst, whilst the partial pressures of carbon monoxide at the catalyst owing to the addition of the synthesis gas effected immediately in front of or in the catalyst vessel are much higher.

The broken-line curve III shows the ratio of the equilibrium concentrations of the two methods of working to each other. From this curve, it can be seen that the process according to the invention gives increasingly favorable results with decreasing partial pressures of carbon monoxide.

In the part of the circuit gas, which is sent through the preheating apparatus, small quantities of iron carbonyl are formed. These quantities are above the theoretical equilibrium concentration in the hot catalyst chamber, so that, here, a decomposition of the carbonyl and, consequently, a soiling of the catalyst would have to take place. According to the invention, protection of the main quantity of the catalyst is obtained by reason of the fact that the highest temperature of the catalyst chamber is adjusted in a catalyst layer which is arranged in front of the first position of supply of fresh gas. In this way, it is only this layer which is exposed to a slight soiling by iron. In the succeeding layers of catalyst, no further decomposition of carbonyl can take place, because there, owing to the maintenance of a lower temperature and an increased partial pressure of carbon monoxide, the concentration of iron pentacarbonyl is below the equilibrium value. The freshly supplied synthesis gas is advantageously freed from the iron carbonyl which is usually formed in the heating in the compressor. This purification may be effected in the known manner with activated charcoal. Also, in order to exclude the possibility of the formation of the slightest quantity of carbonyl in the inlet pipes for the fresh synthesis gas and the cold circuit gas, these inlet parts and, also, if required, the mixing devices for the freshly supplied gas may be made of carbon-monoxide resisting metals, for example copper or V$_2$A steels—18/8 austenitic chrome-nickel steels. These small quantities of material may be procured without difficulty.

In addition to the possibility of utilising iron apparatus, the process according to the invention affords further advantages.

A gas having a low content of carbon monoxide circulates in the circuit-gas system. Accordingly, not a single jointing surface of the bulky apparatus comes into contact with gases rich in carbon monoxide. In this way, leaks attributable to the action of carbon monoxide and, consequently, losses of gas as well as danger to the attendant personnel are largely eliminated.

Attention to the apparatus is simplified and the certainty of operation is considerably increased, since the partial pressure of carbon monoxide can be adjusted directly at the catalyst and an instantaneous interruption of the reaction in the case of danger is possible by stopping the supply of fresh gas.

Finally, the process according to the invention renders possible the useful employment of the apparatus generally used for high-pressure synthesis of benzine and synthesis of ammonia, which apparatus are known not to consist of materials resistants to carbon monoxide, for the synthesis of methanol and other alcohols.

Moreover, the known synthesis gases and catalysts can be employed for the process according to the invention.

*Example*

The method of operation will be explained with the aid of the works arrangement which is represented diagrammatically in Figure 3 and which has been tested in uninterrupted, continuous working for more than a year.

I is the synthesis oven in which the catalyst is accommodated, distributed in six layers. Circuit gas is supplied to the oven through a pipe 2 after it has been heated in the heat exchanger 3 to the entry temperature of 325° C. The gas flows from the heat exchanger 3, through the pipe 4, into the long-path preheater 5 which serves for heating to a high temperature on commencing working, and, from this, into the contact oven. Fresh gas arrives through the pipe 6 into the distributing system 7 which consists of a plurality of pipes and to which still cold circuit gas can be supplied through the pipe 8. The gases flow from the contact oven through the pipe 9 to the heat exchanger 3. Here they give up a part of their heat to the circuit gas that is flowing to the contact oven. They are then passed, through the pipe 10 and the water condenser 11, into the separator 12 in which the liquefied reaction product is separated. The latter product leaves the separator 12 through the pipe 13. The unconverted gas passes through the pipe 14 to the gas-circulating pump 15 and, from the latter, part of the gas passes through the pipe 16 to the heat exchanger 3 and part passes through the pipe 8 directly into the distributing system 7. A suitable quantity of gas is taken from the circuit through the pipe 17 in order to prevent a great increase of inert constituents.

In the works experiment, the pressure prevailing in the apparatus amounted to 300 atmospheres. The fresh gas containing 30% of carbon monoxide passed into the contact oven at the rate of 9500 cubic metres (N. T. P.) per hour. The oven contained 3300 litres of contact mass which consisted of 75% of zinc oxide and 25% of chromium oxide and was divided into six layers. The fresh synthesis gas was added before the second and the succeeding layers of catalyst. The cold circuit gas, containing 5% of carbon monoxide, which was added into the catalyst vessel at the rate of 10,000 cubic metres (N. T. P.) per hour, could, in addition to being delivered to the lower layers, also be delivered to the top layer of catalyst in order to be able to regulate the temperature conditions in the contact oven as desired. The main stream of 50,000 cubic metres (N. T. P.) per hour of circuit gas preheated in the heat exchanger and the long-path preheater and likewise containing 5% of carbon monoxide entered the catalyst vessel at 325° C. The temperature at which it left the first layer of catalyst amounted to 370° C. Between the first and second layers of catalyst, the circuit gas was mixed with the main quantity of the fresh synthesis gas introduced and it then met the second layer of catalyst, the temperature at the leaving end of which was adjusted to 350° C. The leaving temperature of the succeeding layers of catalyst were regulated to the same temperature. This adjustment of temperature was effected by suitably proportioning the particular quantities of synthesis gas and/or cold circuit gas added at the entry to the layers. The reaction products leaving the catalyst chamber at a temperature of 350° C. arrived in the heat exchanger where they were cooled to about 120° C. by the circuit gas flowing in counter-current. A further cooling to 25° C. was then effected in the water condenser. In the separator, the methanol, which was produced at the rate of 4 tons per hour, was separated. The quantity of circuit gas leaving the separator amounted to about 61,000 cubic metres (N. T. P.) per hour. Of this, about 800 cubic metres (N. T. P.) were branched off the circuit for the purpose of preventing the production of an excessive quantity of methane, nitrogen etc. 60,000 cubic metres (N. T. P.) were passed back into the synthesis apparatus by the gas-circulating pump.

The output of methanol of 4 tons per hour corresponded to a specific catalyst output of 1.2 kgs. per litre and hour. The catalyst showed, after a working period of 12 months, its full initial activity, even in the first layer which served for the separation of iron. The methanol produced corresponded, in all its properties, especially also in its content of iron, to the products obtained in the usual apparatus equipped with material resistant to carbon monoxide.

What we claim is:

1. In a process for the synthesis of alcohols from a synthesis gas containing carbon monoxide and hydrogen employing total pressures of between 100 and 600 atmospheres which includes heating the synthesis gas to reaction temperatures above 250° C., passing such heated gas through a reaction zone containing a catalyst, cooling the gas after leaving the reaction zone, reheating at least a portion of the cooled gas to above 250° C. and recycling the heated gas through the reaction zone, the steps which comprise maintaining such gas in contact with a ferrous metal non-resistant to carbon monoxide during such process, maintaining a partial pressure of the carbon monoxide in the gas from the time it leaves the reaction zone to the time it is heated and recycled to the reaction zone of up to 20 atmospheres and introducing a fresh gas richer in carbon monoxide than the recycled gas at a temperature below 100° C. into the reaction zone in an amount sufficient to increase the partial pressure of the carbon monoxide in the synthesis gas at the point the fresh gas is introduced into the reaction zone to above 20 atmospheres.

2. A process in accordance with claim 1, in which a reaction temperature above 300° C. is maintained in the reaction zone.

3. A process in accordance with claim 1 in which said fresh gas is introduced into the recycled gas in the reaction zone.

4. A process in accordance with claim 1 which comprises in addition mixing a portion of the cooled gas without reheating to reaction temperatures with said fresh gas before it is introduced into the recycled reheated gas.

5. In a process for the synthesis of alcohols from a synthesis gas containing carbon monoxide and hydrogen employing total pressures of between 300 and 600 atmospheres which includes heating the synthesis gas to reaction temperatures above 250° C., passing such heated gas successively through a plurality of individual catalyst layers in a reaction zone, cooling the gas after leaving the reaction zone, reheating at least a portion of the cooled gas to above 250° C. and recycling the reheated gas through the reaction zone, the steps which comprise maintaining such gas in contact with a ferrous metal non-resistant to carbon monoxide during such process, maintaining a partial pressure of the carbon monoxide in the gas from the time it leaves the reaction zone to the time it is heated and recycled to the reaction zone of up to 20 atmospheres and introducing a fresh gas richer in carbon monoxide than the recycled gas at a temperature below 100° C. into the second and succeeding layers of the catalyst in the reaction zone in an amount sufficient to increase the partial pressure of the carbon monoxide in the synthesis gas at the points the fresh gas is introduced into the reaction zone to above 20 atmospheres.

6. A process in accordance with claim 5 which in addition comprises the step of maintaining a higher temperature in the first catalyst layer than in the succeeding layers.

ERNST PEUKERT.
FRIEDRICH HILBERATH.

REFERENCES CITED

The following references are of record in the file of this patent:

UNITED STATES PATENTS

| Number | Name | Date |
|---|---|---|
| 2,279,052 | Michael et al. | Apr. 7, 1942 |
| 2,411,760 | Sensel | Nov. 26, 1946 |
| 2,414,276 | Sensel et al. | Jan. 14, 1947 |

FOREIGN PATENTS

| Number | Country | Date |
|---|---|---|
| 247,217 | Great Britain | June 7, 1927 |

OTHER REFERENCES

Mellor: "Comprehensive Treatise on Inorganic and Theoretical Chemistry," vol. 5, page 958.
Cleaves et al.: "The Metal-Iron," pp. 77–78.